(12) United States Patent
Barrett et al.

(10) Patent No.: US 9,900,670 B2
(45) Date of Patent: Feb. 20, 2018

(54) PORTABLE COMMUNICATION GATEWAY FOR UTILITY METERING DEVICES

(71) Applicant: Landis+Gyr Innovations, Inc., Alpharetta, GA (US)

(72) Inventors: Cecil Barrett, Lawrenceville, GA (US); Anthony DePoy, Cumming, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

(21) Appl. No.: 15/197,008

(22) Filed: Jun. 29, 2016

(65) Prior Publication Data

US 2018/0007452 A1    Jan. 4, 2018

(51) Int. Cl.
*H04Q 9/00* (2006.01)

(52) U.S. Cl.
CPC ........... *H04Q 9/00* (2013.01); *H04Q 2209/60* (2013.01); *H04Q 2209/86* (2013.01)

(58) Field of Classification Search
None
See application file for complete search history.

(56) References Cited

U.S. PATENT DOCUMENTS

| 2005/0195775 A1* | 9/2005 | Petite | H04W 72/082 370/338 |
| 2009/0115626 A1* | 5/2009 | Vaswani | G01D 4/004 340/870.02 |
| 2011/0298634 A1* | 12/2011 | Beverung | H04Q 9/00 340/870.02 |

OTHER PUBLICATIONS

International Application No. PCT/US2016/040066, International Search Report and Written Opinion dated Mar. 17, 2017, 12 pages.

\* cited by examiner

*Primary Examiner* — Firmin Backer
*Assistant Examiner* — Jerold Murphy
(74) *Attorney, Agent, or Firm* — Kilpatrick Townsend & Stockton LLP (57) ABSTRACT

A communication gateway communicates with a utility meter and a meter servicing device. The communication gateway includes a one-way processing module to process communications received from a one-way utility meter and includes a two-way processing module to process communications received from a two-way utility meter. For communications from a one-way utility meter the communication gateway may decode a signal received from the meter to obtain only certain information. For example, metering information may be extracted from the signal, but a spreading sequence may not be decoded.

16 Claims, 4 Drawing Sheets

PORTABLE COMMUNICATION GATEWAY FOR UTILITY METERING DEVICES

TECHNICAL FIELD

This disclosure relates generally to the field of utility metering devices, and more specifically relates to a communication gateway for servicing one-way and two-way utility metering devices.

BACKGROUND

Resources, such as water, gas, or electricity, are often measured by utility metering devices. Utility metering devices transmit information, such as information about a consumed quantity of the resource, to a utility network that enables collection of data about the resource usage. Such collected information can be used for measurement, maintenance, or other functions related to the utility. However, utility meters may require updates to software or firmware, or they may malfunction. Thus, it is desirable to have available service tools, such as a meter servicing device, that are capable of providing updates to and diagnosing problems with a meter. Certain utility meters, such as two-way meters, may be capable of transmitting signals describing their own function, and may also be capable of receiving signals, such as a signal received from a meter servicing device. Other utility meters, such as one-way meters, may be capable of transmitting signals describing their own function, but may lack the capability to receive signals from a meter servicing device. Thus, it is desirable to have available service tools that are capable of enabling communication to and/or from a variety of utility meter types. It is further desirable that such service tools have a maximized battery life, and be sized such that they can be carried comfortably in the field by a person, such as a meter service technician.

Some one-way meters transmit signals using spreading code encoding technology, such that the transmitted signals include information identifying the one-way meter. Some examples of spreading code technology include direct-sequence spread spectrum (DSS) technology and code division multiple access (CDMA) technology. Received spreading code signals are identified by decoding the identifying information. Signals that include a spreading code can be transmitted using relatively small and inexpensive components. However, decoding the identifying information in a received spreading code signal requires relatively complex and expensive components. A service tool that uses complex components may be too large or heavy for a technician to carry easily, or may have an impractically short battery life. Thus, it is desirable to provide a solution for communicating with one-way meters that uses a small, lightweight device that is easily carried and that has an adequate battery life.

BRIEF SUMMARY

A meter servicing device may communicate with a selected one-way or two-way utility meter through a communication gateway device. The servicing device and the communication gateway may each be located nearby the selected utility meter. The communication gateway may be capable of receiving control signals from the servicing device, such as control signals that enable one-way or two-way processing within the communication gateway.

In an example implementation, a communication signal from a one-way meter is received by the gateway. The communication signal may include identification data that may be encoded using a spreading code, and may also include metering information. The communication signal may be filtered to eliminate one or more signal components. For example, the communication signal may be filtered to eliminate signal components related to spreading code encoding to allow metering information to be extracted from the communication signal without decoding the spreading code. The extracted metering information may be provided to the meter servicing device.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

The invention will be better understood from the following description when considered in connection with the accompanying figures. It is to be expressly understood, however, that each of the figures is provided for the purpose of illustration and description only, and is not intended as a definition of the limits of the present invention.

DETAILED DESCRIPTION

Aspects of the invention facilitate servicing one-way utility meters and two-way utility meters using a portable communication gateway. A communication gateway may communicate with a utility meter and with a meter servicing device. The communication gateway may be configured to communicate with either a one-way utility meter or a two-way utility meter. When communicating with a one-way utility meter, the communication gateway receives a signal from the one-way utility meter. Typically, the signal includes a packet where the header of the packet includes information that identifies the utility meter, such as an address or a meter identifier, and the body of the packet includes metering information, such as usage information or meter status information. The communication gateway decodes the signal to obtain the metering information, but may ignore other aspects of the signal received from the utility meter. For example, the communication gateway may not decode a spreading code included in the signal. By limiting the processing performed by the communication gateway, the number and complexity of the components required to implement the communication gateway are minimized, which minimizes the size and weight of the communication gateway and maximizes its battery life.

Figure 1:
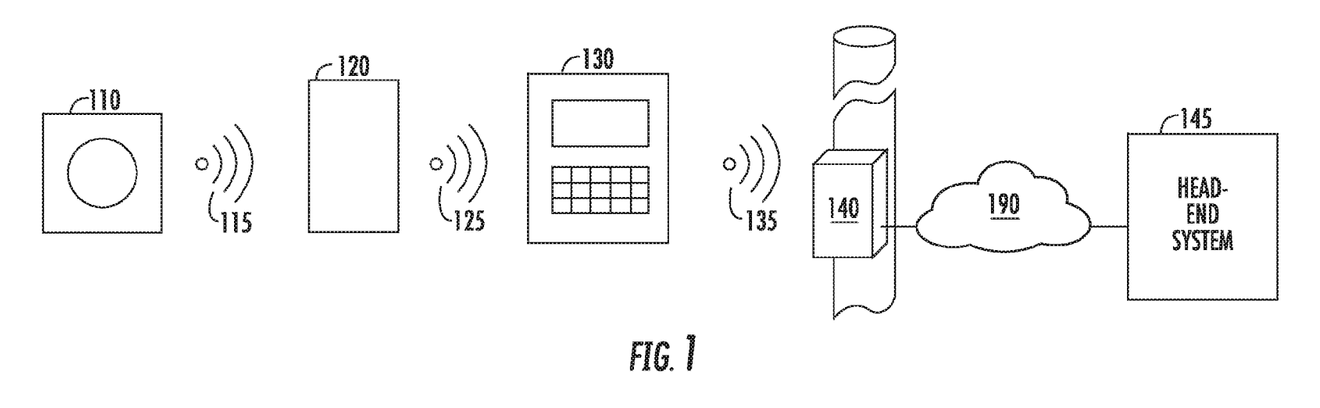
FIG. 1 is a block diagram depicting an example of a communication session between a selected utility meter, a communication gateway, and a meter servicing device.

FIG. 1 illustrates an exemplary communication session between a selected utility meter, a communication gateway, and a meter servicing device. An example utility meter 110 may be located at a premises and may be accessible by a service technician. In some cases, the utility meter 110 may be adjacent to a stand-alone building, such that no other utility meters are located nearby (e.g., within about 6-10 feet). In other cases, the utility meter 110 may be adjacent to a multi-unit building, such that one or more additional utility meters are located nearby. An additional utility network component, such as a collector unit 140, may be located in a general area of the utility meter 110.

A service technician may select the utility meter 110 for servicing, and approach the selected meter 110 with a communication gateway 120. The communication gateway 120 and a meter servicing device 130 may be in communication with each other, such as via a wireless or a wired connection. In one implementation, the service technician carries the communication gateway 120 towards the utility meter 110 and the meter servicing device 130 remains in a service vehicle. In another implementation, the communication gateway 120 and meter servicing device 130 may be integrated into a single device.

The meter servicing device 130 may provide a control signal to the communication gateway 120 indicating whether the selected utility meter 110 is a one-way meter or a two-way meter. Responsive to receiving the control signal, the communication gateway 120 may be configured to operate in either a first mode or a second mode. The first operating mode may facilitate communication with a one-way utility meter and the second operating mode may facilitate communication with a two-way utility meter.

A communication session, using either one-way or two-way communications, may be initiated between the selected meter 110 and the meter servicing device 130 via any suitable method. For example, the session could be initiated by an interaction with a one-way meter, such as the service technician applying a magnetic key or a radio frequency identification (RFID) card to the utility meter. Alternatively, the session could be initiated by an event internal to the selected meter 110, such as by an internal timer. For a two-way meter, the session may be initiated by a signal transmitted to the meter by the servicing device 130 or the gateway 120.

Once the communication session is initiated, the selected utility meter 110 may transmit a communication signal 115 to the communication gateway 120. The communication signal 115 may include a packet with a header and a body. Information in the header may identify the utility meter and information in the body may relate to operation of the meter. The gateway 120 may decode and process the signal 115 and may transmit a signal 125 to the meter servicing device 130. The signal 125 may include some or all of the information included in the signal 115. The signal 125 may include information in addition to the information included in the signal 115. Although FIG. 1 depicts the signal 125 as being transmitted via a wireless connection, other connections, such as a data bus or a wired connection between gateway 120 and servicing device 130, are possible.

The meter servicing device 130 may present some or all of the information included in the signal 125 on a display device. Additionally or alternatively, the servicing device 130 may provide the information to the utility network. For example, the servicing device 130 may communicate with a suitable utility network component, such as collector unit 140 or any other suitable network component. Such communication with the utility network may occur at a different time, such as after the service technician has moved the servicing device 130 to a location within communication range of the collector unit 140.

In some cases, the metering information received from a one-way utility meter 110 may be associated with identifying information that is not received in signal 115. For example, the service technician may provide identifying information, such as a street address or serial number associated with the selected utility meter 110, to the servicing device 130 or communication gateway 120. Identifying information could also be received from other devices, such as from a collector unit 140 or a global positioning system (GPS) unit. The servicing device 130 may associate the metering information with the appropriate meter based on the identifying information.

Figure 2:
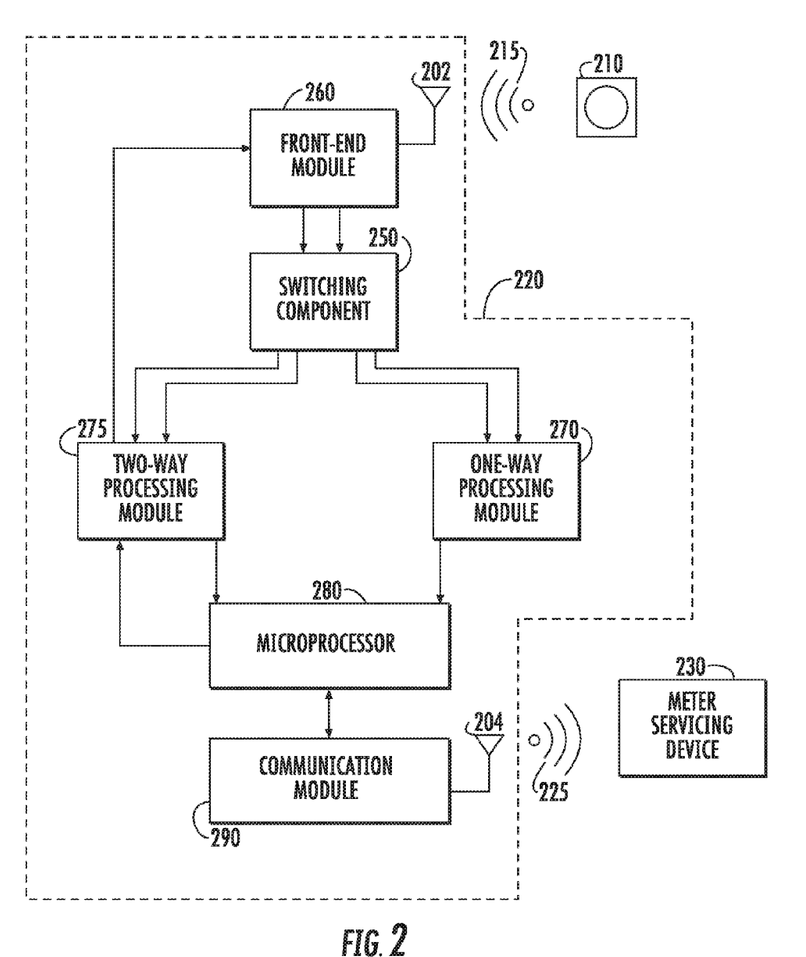
FIG. 2 is a block diagram for an exemplary implementation of a communication gateway that may provide one-way communication and two-way communication.

FIG. 2 is a block diagram for an exemplary implementation of a communication gateway 220 that may provide one-way communication and/or two-way communication. Other implementations are possible.

A gateway 220 may be capable of communicating with a selected utility meter, such as meter 210, and a meter servicing device, such as servicing device 230. The gateway 220 may communicate with meter 210 via a first antenna 202, and with servicing device 230 via a second antenna 204. In some cases, antenna 202 and antenna 204 may be a same antenna. A communication module 290 may transmit and receive signals via antenna 204 using any suitable protocol, such as the WiFi™ or Bluetooth™ protocol. In some cases, either or both of antenna 204 and communication module 290 may be replaced by suitable communication components, such as a wired connection or a bus.

The communication module 290 may receive signals from servicing device 230. Responsive to receiving such signals, operation of one or more components of the gateway 220 may be adjusted. In some cases, a received control signal is interpreted by a microprocessor 280, and responsive to such interpretation, the microprocessor 280 may adjust operation of the components, including the microprocessor, of the gateway. For example, a control signal received from the servicing device 230 may control a switching component 250 and may cause the gateway 220 to operate in either a first operating mode for communication with a one-way meter or a second operating mode for communication with a two-way meter. Alternatively, operation of the gateway 220 may be adjusted by other inputs or signals, such as by toggling a switch on the gateway 220.

The gateway 220 receives a signal 215 from meter 210 via antenna 202 and provides the signal to a front-end module 260. The front-end module 260 may modify the received signal without changing meaningful content of the signal. For example, the front-end module 260 may amplify the signal, or filter out extraneous frequencies. The front-end module 260 may provide the modified signal to a one-way processing module 270, or to a two-way processing module 275, or to both.

In the first operating mode the switching component 250 may enable one-way processing by connecting the front-end module 260 to the one-way processing module 270. In the second operating mode the switching component 250 may enable two-way processing by connecting the front-end module 260 to the two-way processing module 275. The switching component may adjust its operation in response to receiving a control signal. One example of a suitable switching component is a relay, but other implementations are possible. For example, the switching component 250 may be omitted, or may enable more than one communication type.

The one-way processing module 270 may process the signal from the front-end module to remove or retain certain types of information represented in the signal, such as removing identification information and/or retaining metering data. The one-way processing module 270 may provide the processed signal to the microprocessor 280.

The two-way processing module 275 may process the signal from the front-end module and may provide the processed signal to the microprocessor 280. In some cases, the two-way processing module 275 may decode a narrow-band data signal, and provide the decoded signal to the microprocessor 280.

The microprocessor 280 may receive the processed signal from the one-way processing module 270 or the two-way processing module 275, or both. The microprocessor 280 may determine one or more types of information that are represented by the processed signal. In some cases, the determination is based on which processing module provides the processed signal. For example, if the processed signal is provided by the one-way processing module, the microprocessor 280 may determine that the type of information is a type related to metering data.

The microprocessor 280 may extract the information from the processed signal. For example, the microprocessor 280 may extract metering data from the signal, and provide the extracted data to communication module 290. In some cases, the microprocessor may also convert the extracted data to a suitable format, such as a digital packet. The microprocessor 280 may provide the data to the communication module 290 for transmission to the meter servicing device 230. For example, the communication module 290 could transmit, via antenna 204, a signal 225 to the servicing device 230. The signal 225 could include the data provided by the microprocessor 280.

In some implementations, two-way communications intended for transmission to the meter 210 may be directed and/or processed. For example, a signal for transmission could be received by the communication module 290 from servicing device 230. The signal for transmission could be subsequently provided to microprocessor 280. The microprocessor 280 could provide the signal for transmission to two-way communication module 275, which could subsequently provide the signal for transmission to the front-end module 260. The front-end module 260 could transmit the signal to the meter 210, via antenna 202. In some cases, the signal intended for transmission could be modified by one or more of the modules included in gateway 220.

Communication Signals

An exemplary signal received from a one-way utility meter may include a carrier signal having a frequency that is modulated using a spread spectrum modulation technique, such as DSS modulation. Using DSS modulation, the carrier frequency may have a modulated frequency selected from a range centered around the nominal value of the carrier frequency. For example, a nominal carrier frequency of approximately 917 MHz could be modulated to a selected frequency of +/−1.2 MHz (e.g., within a range of approximately 915.8 MHz to approximately 918.2 MHz). In some implementations, the carrier frequency may be periodically remodulated, such that the instant modulated carrier frequency is changing periodically (e.g., multiple times per second).

The signal may include a spreading sequence, also called a pseudorandom bit sequence, such as a pseudorandom code included in the DSS modulated carrier frequency. One advantage of modulating a carrier frequency with a spreading code is to reduce the possibility of interference with the transmitted signal. In some cases, the pseudorandom sequence may identify the instant modulated carrier frequency. The pseudorandom sequence may be represented via encoded "high" or "low" pulses included in the signal.

High and low pulses may be encoded by modifying a suitable quality of the carrier frequency, such as phase. The phase of the carrier frequency may be modified by binary phase shift keying (BPSK) technology, such that respective high and low pulses are encoded by respective portions of the carrier signal that are 180 degrees out of phase. Decoding phase-shifted pulses may require comparing the exemplary signal to a reference frequency that is synchronized to the carrier frequency included in the exemplary signal. For example, the reference frequency and the carrier frequency may have an identical, or approximately identical, frequency. If the carrier frequency component of the exemplary signal is periodically remodulated, such as described above, the reference frequency may also need to be periodically remodulated, while remaining synchronized to the carrier frequency. Decoding the phase-shifted portions of the signal may require additional circuitry and components capable of determining remodulation of the carrier frequency, remodulating the reference frequency, synchronizing the carrier and reference frequencies, and comparing the synchronized frequencies.

The signal may further include a series of pulses, or "chips," where the series of chips includes a predetermined sequence of high or low pulses representing the spreading code. In some cases, the spreading code may identify the particular frequency that is the instant modulated carrier frequency. The quantity of chips transmitted over time, or "chip rate," may be based on the instant carrier frequency, such as an example chip rate of 2,000,000 chips per second. Since the carrier frequency may be periodically remodulated, identifying the instant modulated carrier frequency, such as by a remote receiver, may require frequent decoding of the chips and chip rate using additional circuitry and components. The spreading codes may be encoded as phase-shifted pulses using BPSK technology, and in such cases, further circuitry may be required to decode the phase-shifted pulses, as described above.

A spreading code may include a predetermined sequence of high and low chips, such as a representative sequence 00111010, that identifies the instant modulated carrier frequency. The spreading code may alternatively include a complement of the predetermined sequence of high and low chips, such as a complement representative sequence 11000101, that also identifies the instant modulated carrier frequency. The available carrier frequencies may be predetermined, such that an representative sequence that identifies a first carrier frequency is not similar to a complement representative sequence that identifies a second carrier frequency.

The signal from the utility meter may also include one or more data signals representing one or more types of information, such as a meter identifier and metering data. The data may be represented by a series of high or low bits, and the bits may be based on any suitable parameter or component of the exemplary signal. Suitable parameters may include (but are not limited to) a frequency, a phase, or an amplitude of the signal, including an amplitude of zero. For example, a single high data bit may be represented by a portion of the received signal that has an amplitude (e.g., a voltage) greater than zero, and a single low data bit may be represented by a portion of the received signal that has an amplitude of zero or approximately zero.

In some implementations, the received signal may encode metering data using On/Off Keying (OOK) technology. For example, the signal may include a carrier frequency, with or without a spreading code, and represented data. Such a signal may encode the data into the signal by varying the amplitude of (e.g., toggling on or off) the carrier frequency. The high and low bits of the represented data may correspond respectively to lengths of time wherein the varied amplitude is considered "On" (e.g., a relatively large voltage) or "Off" (e.g., a relatively small or zero voltage). The On/Off portions of the signal may be introduced by a device transmitting the signal, such as a transmitting utility meter.

A high or a low bit that may be used to represent metering information should not be confused with a high or a low chip that may be included in a spreading code. However, in some implementations, a boundary of a data bit, such as a leading bit edge, may be synchronized with a chip rate, and the time length of a bit may be based on the time length of a predetermined number of chips. Decoding the data, such as by a receiver, may require comparing a given bit or bit boundary against a synchronized clock that is based on the chip rate, to determine the number of bits that have been received (e.g., determining that four sequential low bits have been received). The data may have a data frequency that describes the number of bits per second, and the data frequency may be related to the chip rate.

For example, if a particular exemplary signal includes a chip rate of 2.46 million chips per second, and further includes data bits with a length based on 128 chips, an included data signal may have a data frequency of 19.2 kilobits per second (e.g., 2.46 million chips/sec divided by 128 chips/bit to produce 19.2 kb/sec). A high data bit may be represented by an On signal portion having a time length approximately equal to the lengths of 128 chips. A low data bit may be represented by an Off portion of the signal having a time length approximately equal to the lengths of 128 chips. An example receiver may decode and interpret the On and Off portions as high or low bits with lengths of 128 chips, without needing to decode or interpret the particular chip sequence, carrier frequency, or phase of the carrier frequency. These example values are for illustration only, and other suitable signals may have other values, frequencies, and qualities.

The data signal may represent information related to identification of the utility meter, information related to metering information collected by the utility meter, information related to maintaining data integrity of the data signal (such as, but not limited to, clock synchronization information), and/or any other suitable information. The data signal may be comprised of one or more packets, or predefined arrangements of bits. For example, a packet may comprise a fixed number of bits (e.g., 1024 bits). An exemplary packet may include a preamble, a header, a body, and a cyclic redundancy check (CRC).

The preamble may include a predefined quantity of similar bits (e.g., 16 sequential high bits). The preamble may enable a receiver to identify the start of a packet. If the bits are comprised by chips, as described above, the preamble may enable the receiver to identify the instant modulated carrier frequency, and to correlate the received packet to the receiver's synchronization signal (e.g., to determine the bit boundaries).

In the example packet, the header may include identification information for the selected utility meter. For example, the header may include bits representing a numeric identification for the selected meter (e.g., a serial number, an Internet protocol (IP) address).

In the example packet, the body may include metering information collected by the selected utility meter. Bits included in the body may represent the metering information using any suitable format, such as (but not limited to) binary data, hexadecimal numbers, or encoded alphanumeric characters. In some cases, other information (e.g., diagnostic information) may be included in the body.

In the example packet, the CRC may include a data integrity value (e.g., a checksum) related to the contents of the packet. The data integrity value may enable a receiver to determine if the contents of a received packet are different from the contents of a transmitted packet. For example, checking the data integrity value could indicate errors introduced during transmission.

Communication Circuit

Figure 3:
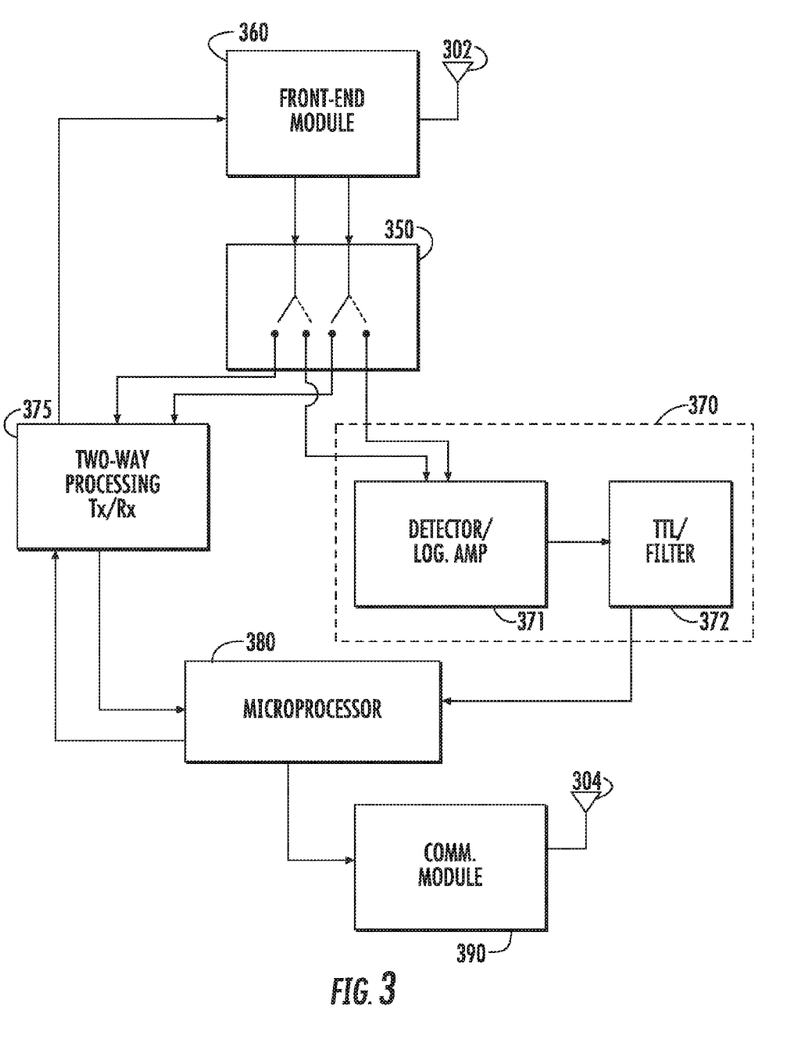
FIG. 3 is a schematic for an exemplary circuit that may provide one way communication and two-way communication. The depicted exemplary circuit may be included in a communication gateway.

FIG. 3 provides additional details for an exemplary one-way processing module 370 in a communication gateway.

The gateway may be capable of communicating with a utility meter via a first antenna 302, and with a meter servicing device via a second antenna 304, such as described in regards to FIGS. 1-2. The first antenna 302 may receive a signal from the utility meter. The received signal, such as (but not limited to) the exemplary signal described above, may comprise a carrier signal having a frequency of approximately 917 MHz, modulated to a selected frequency of +/−1.2 MHz (e.g., within a range of approximately 915.8 MHz to approximately 918.2 MHz). The received signal may further include a phase-shifted spreading code identifying the carrier frequency, and one or more data signals, each data signal having a data frequency suitable to the type of information represented by the data signal. For example, a data signal related to metering information could have a data frequency of approximately 19.2 kbps.

The received signal may be provided to the front-end module 360. The front-end module 360 may include a low-noise amplifier to amplify the signal and may provide the modified signal to a switching component 350.

The switching component 350 enables one-way or two-way communication, as described above in regards to FIG. 1-2. An example of a suitable switching component is a double-pull/double-throw relay, but other implementations are possible. The switching component 350 may adjust its operation in response to a control signal, as described above. Responsive to the control signal, the switching component 350 may direct a communication from the front-end module 360 to either the one-way processing module 370 or the two-way processing module 375.

One-Way Communication

If one-way communication is enabled, the signal is provided to the one-way processing module 370 via the switching component 350. The one-way processing module 370 may comprise a detector 371 and a digital filter 372. FIG. 3 depicts the detector 371 as providing a signal to digital filter 372, but other implementations are possible.

The detector 371 may logarithmically amplify the modified signal, such that the amplification reduces large differences in the voltage level of the modified signal. An example of a suitable detector is a logarithmic detector component AD8313 from Analog Devices™, but other implementations are possible.

A digital filter 372 may filter the modified signal to remove and/or retain certain frequencies. The removed or retained frequencies may represent certain types of information. For example, the digital filter 372 could receive a signal comprising a carrier frequency of approximately 917 MHz, which may be periodically remodulated as described above; a phase-shifted spreading code identifying the carrier frequency; and a metering data signal of approximately 19.2 kbps, which may be related to a chip rate as described above. In this example, the digital filter 372 could filter the received signal to remove the carrier frequency, such as by filtering out all frequencies greater than a threshold filter value, such as 5 MHz.

In certain implementations, the digital filter 372 may filter the received signal to remove the spreading code. For example, if the received signal is filtered to remove all frequencies greater than a 1 MHz threshold filter value, then a spreading code having a chip rate of 2.46 million chips/sec may also be filtered out. The digital filter 372 may additionally retain a data signal that is included in the received signal. For example, if the received signal is filtered to remove all frequencies greater than a 1 MHz threshold filter value, then a data signal having a frequency of 19.2 kbps may be retained. By performing these or similar steps, the digital filter 372 may process the received signal such that the metering data signal is retained, while the carrier frequency and the spreading code data signal are removed.

In certain other implementations, the digital filter 372 may determine components of the data signal. For example, the digital filter 372 could identify the chips that are included in the spreading code, and or may identify a chip rate. The digital filter 372 may determine a data bit boundary based on the identified chip rate.

The digital filter 372 may "clean up" the filtered signal such that the retained signal is adjusted to standardized voltage levels (e.g., transistor-transistor logic (TTL) levels). An example of a suitable digital filter is low-pass filter having a passband at 20 kHz and a stopband at 40 kHz, but other implementations are possible. In some cases, the filtered signal may be adjusted (e.g., "cleaned") based on a determined data bit boundary, as described above.

The one-way processing module 370 may provide the processed signal to the microprocessor 380. For example, the digital filter 372 may provide the processed (e.g., amplified and filtered) signal to the microprocessor 380.

One advantage of filtering out the carrier frequency or the spreading code in the one-way processing module is that the metering information may be extracted without decoding the spreading sequence. This approach requires fewer and less complex components than a processing module that decodes the spreading sequence. Although information transmitted by the utility meter that requires decoding the spreading sequence is not extracted, the communication gateway or the servicing device may be able to provide similar information. For example, if information identifying the meter is not extracted, then the communication gateway or the servicing device may provide information that identifies the meter or can be used to identify the meter, such as a serial number, an address of the premises, or geographic coordinates.

Two-Way Communication

If two-way communication is enabled, the signal is provided to the two-way processing module 375 via the switching component 350. The two-way processing module 375 may process the signal and provide the processed signal to the microprocessor 380.

Extracting Information

The microprocessor 380 may receive the processed signal from either the one-way processing module 370 or the two-way processing module 375. In some cases, the microprocessor 380 may determine one or more types of information represented by the processed signal, based on the enabled communication path that provides the processed signal. Responsive to determining the type of information, the microprocessor 380 may extract the information from the processed signal. The microprocessor 380 may provide the extracted data to communication module 390.

For example, the microprocessor 380 could receive, from the one-way communication module 370, a processed signal including metering data represented in a TTL voltage form, as described above. The microprocessor 380 could determine, based on the processed signal, the type of information (e.g., metering data). Responsive to determining the type of information, the microprocessor 380 could extract the represented information (e.g., interpreting the TTL signal to determine the particular metering data represented by the signal). The microprocessor 380 may provide the extracted information to the communication module 390, using any suitable information format (e.g., a digital packet).

The communication module 390 may transmit the extracted information via an antenna 304. For example, the communication module 390 could transmit a signal including the extracted information to a meter servicing device, as described in regards to FIG. 1-2.

Figure 4:
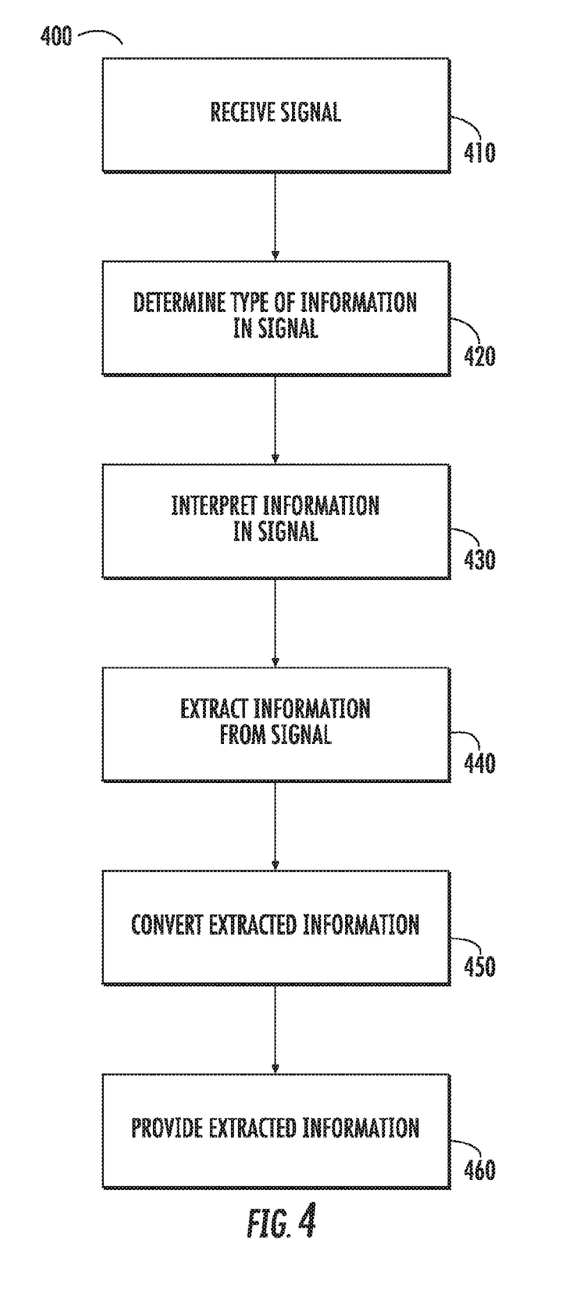
FIG. 4 is a flowchart depicting an example of operations performed by a microprocessor, according to certain implementations.

FIG. 4 is a flow chart depicting an example of a process 400 including operations that may be performed by a microprocessor, such as microprocessor 280. For illustrative purposes, the process 400 is described with reference to the examples depicted in FIGS. 1-3. Other implementations, however, are possible.

At block 410, process 400 involves receiving a signal. For example, the signal could be received via one-way or two-way communication, as described in regards to FIGS. 1-3. In some cases, receiving the signal via one-way communication may include receiving a processed signal from a digital filter, such as digital filter 372. In some implementations, the signal could be provided by one or more components enabling communication, as described above.

At block 420, process 400 involves determining a type of information represented by the signal. The determination of the type of information may be based on the components that provide the processed signal. For example, block 420 may include operations for determining whether the signal was received from components in the one-way or two-way communication path. In some cases, block 420 may include operations to determine that the signal represents metering data processed via the one-way processing module 270. Additionally or alternatively, block 420 may include operations to determine that the signal represents metering and identification data processed via the two-way processing module 275.

At block 430, process 400 involves interpreting the determined type of information represented by the signal. Interpreting the type of information may include interpreting parameters of the signal, such as voltage, frequency, or other signal parameters. For example, block 430 may include operations for interpreting a processed signal comprising TTL voltage levels, such as described in regards to FIGS. 1-3. Additionally or alternatively, voltage levels of a TTL signal could be interpreted as representing logical bits in a sequence.

At block 440, process 400 involves extracting the information represented by the signal. In certain implementations, block 440 optionally includes operations for storing the extracted information, such as in a memory structure for exemplary microprocessor 280. For example, microprocessor 280 could store the extracted information in a chip-level memory, for later processing or transmission of the extracted information.

At block 450, process 400 involves optionally converting the extracted information to a format suitable for communication. For example, block 450 may include operations for converting the extracted information to one or more digital packets. In certain implementations, block 450 optionally includes operations for retrieving from memory the extracted information and subsequently converting the retrieved information to a suitable format. Block 450 may optionally include operations for storing the converted information, such as in a memory structure for exemplary microprocessor 280. For example, microprocessor 280 could store the converted information in a chip-level memory, for delayed transmission of the converted information.

At block 460, process 400 involves providing the extracted information for communication or further processing. For example, the extracted information could be provided to a communication module 280. The exemplary communication module could then transmit the extracted information, as described in regards to FIGS. 1-3. In certain implementations, the extracted information is optionally provided in a converted format that is suitable for communication. Additionally or alternatively, the extracted information may be provided in a native format, suitable for further processing. For example, block 460 may optionally include operations for providing the extracted information to an exemplary communication module that is capable of processing the extracted information further.

Communicating Extracted Information

Returning to FIG. 1, a selected utility meter 110 may communicate with a communication gateway 120, as described above. The selected meter 110 may provide and/or receive (such as for a two-way meter) a signal 115 to or from the gateway 120. The received signal 115 may represent one or more of metering information, identification information, or any other suitable information. The gateway 120 may amplify, filter, interpret, or otherwise process the received signal 115 or the represented information, as described above. For example, the gateway 120 may process the received signal 115 such that metering information is retained and identification information is removed. The gateway 120 may provide a resulting signal 125 based on processing the received signal 115.

The gateway 120 may provide a signal 125 to a meter servicing device 130. The signal 125 may be based on the received signal 115. The meter servicing device 130 may use the information included in signal 125. For example, servicing device 130 may present on a display device some or all of such information represented by signal 125.

The meter servicing device 130 may modify the information included in signal 125. For example, the servicing device 130 could modify the information to include additional information, such as identification information obtained from a source other than signals 115 or 125. Examples of such additional information include, but are not limited to, data received from a GPS unit in communication with servicing device 130; inputs provided by a service technician; and/or data received from an additional utility network component, such as a collector 140. The additional information may be received by the servicing device 130 at a different time from when signal 125 is received. For example, the servicing device 130 may receive and store a meter serial number via technician input prior to communicating with the selected meter 110. Additionally or alternatively, the servicing device 130 may receive network location information from collector 140 after ending communication with the selected meter 110.

The meter servicing device 130 may provide the information, including the additional information, to one or more utility network components. The servicing device 130 may provide the information to a collector 140. FIG. 1 depicts a portion of an exemplary system where servicing device 130 transmits the information via signal 135, but other implementations are possible. Although FIG. 1 illustrates a single utility meter, typically the system includes a number of utility meters and other network components that communicate wirelessly. In the case of two-way utility meters, the meters and other network components may be configured as a wireless mesh network.

The information may be provided by a utility network component, such as collector 140, and received by one or more additional utility network components, such as a head-end system 145. The information may be provided and received via a computer network 190. The network 190 may be any suitable computer communication network, including (without limitation) a local-area network (LAN), a wide-area network (WAN), a private intranet, etc.

The processes described herein may be implemented using as computer-executable instructions that, when executed by a processing device cause the processing device or other devices controlled by the processing device to perform the appropriate operations. The instructions may be stored on a computer-readable medium such as (but not limited to) an electronic, optical, magnetic, or other storage device capable of providing a processing device with computer-readable instructions. The instructions may comprise processor-specific instructions generated by a compiler and/or an interpreter from code written in any suitable computer-programming language.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of decoding a communication signal from a utility meter, the method comprising:
   receiving a communication from the utility meter at a communication gateway, wherein:
   the communication is carried via a signal with a modulated carrier frequency and a spreading sequence comprised of multiple chips, and
   the communication includes a packet comprised of multiple data bits, wherein each data bit has (i) a respective level based on an amplitude of the modulated carrier frequency and (ii) a respective boundary and a respective length of time based on a predetermined quantity of the multiple chips, wherein the packet comprises a preamble that includes a predetermined quantity of the multiple data bits, a header that includes information identifying the utility meter, and a body that includes metering information;
   filtering the communication to remove the modulated carrier frequency and to extract the metering information without decoding the spreading sequence, wherein extracting the metering information includes:
   determining, based on the predetermined quantity of the multiple data bits included in the preamble, the respective boundary and the respective length of time of each data bit included in the communication, and
   determining, based the respective boundary and the respective length of time, the respective level of each data bit included in the communication;
interpreting the metering information; and
transmitting the interpreted metering information to a meter servicing device.

2. The method of claim 1 wherein filtering the communication to remove the carrier frequency comprises using a non-linear logarithmic decoder.

3. The method of claim 1 further comprising:
receiving a control signal from the meter servicing device at the communication gateway prior to receiving the communication from the utility meter; and
in response to receiving the control signal, configuring the communication gateway to operate in a first operating mode that enables communication with the utility meter that supports one-way communication.

4. The method of claim 1 further comprising:
receiving a second control signal from the meter servicing device at the communication gateway; and
in response to receiving the second control signal, configuring the communication gateway to operate in a second operating mode that enables communication with a second utility meter that supports two-way communication.

5. The method of claim 1, wherein the spreading sequence identifies the modulated carrier frequency.

6. The method of claim 1, further comprising:
after filtering the communication to remove the modulated carrier frequency, comparing the spreading sequence against a clock;
using the comparison to determine the respective boundary of a particular data bit of the multiple data bits;
using the particular data bit boundary to determine a first length of time wherein the spreading sequence has a relatively large voltage and a second length of time wherein the spreading sequence has a relatively small voltage; and
decoding the first length of time as a high data bit and the second length of time as a low data bit.

7. A system for decoding a communication signal from a utility meter, the system comprising:
a communication gateway configurable to operate in a first operating mode that enables communication with a one-way utility meter or a second operating mode that enables communication with a two-way utility meter; and
a meter servicing device in communication with the communication gateway, wherein the meter servicing device transmits a control signal to the communication gateway to configure the communications gateway in the first operating mode or the second operating mode,
wherein when the communication gateway is configured in the first operating mode, the communication gateway is operable to:
   receive a communication from the one-way utility meter, wherein:
      the communication is carried via a signal with a modulated carrier frequency and a spreading sequence comprised of multiple chips, and
      the communication includes a packet comprised of multiple data bits, wherein each data bit has (i) a respective level based on an amplitude of the modulated carrier frequency and (ii) a respective boundary and a respective length of time based on a predetermined quantity of the multiple chips, wherein the packet comprises a preamble that includes a predetermined quantity of the multiple data bits, a header that includes information identifying the one-way utility meter, and a body that includes first metering information;
   decode the communication to extract the first metering information without decoding the spreading sequence, wherein extracting the metering information includes:
      determining, based on the predetermined quantity of the multiple data bits included in the preamble, the respective boundary and the respective length of time of each data bit included in the communication, and
      determining, based the respective boundary and the respective length of time, the respective level of each data bit included in the communication; and
   transmit the first metering information to the meter servicing device.

8. The system of claim 7, wherein the communication gateway further comprises:
a front end module for amplifying and filtering the signal;
a non-linear logarithmic decoder for filtering out the modulated carrier frequency to extract the first metering information without decoding the spreading sequence; and
a processor for interpreting the first metering information.

9. The system of claim 7, wherein the communication gateway further comprises:
a wireless transceiver for wirelessly communicating with the meter servicing device.

10. The system of claim 7, wherein when the communication gateway is configured in the second operating mode, the communication gateway is operable to:
receive a communication from the two-way utility meter;
process the communication to extract second metering information and meter identification information for the two-way utility meter; and
transmit the second metering information and the meter identification information for the two-way utility meter to the meter servicing device.

11. The system of claim 7, wherein the meter servicing device is operable to:
receive the first metering information from the communication gateway;
associate the first metering information with the information identifying the one-way utility meter; and
transmit the first metering information and the information identifying the one-way utility meter to a network device.

12. The system of claim 7, wherein the spreading sequence identifies the modulated carrier frequency.

13. The system of claim 7, wherein the communication gateway is operable to decode the communication by:
filtering the signal to remove the modulated carrier frequency; and
comparing the spreading sequence against a clock;
determining, based on the comparison, the respective boundary of a particular data bit of the multiple data bits;

determining, based on the determined data bit boundary, a first length of time wherein the spreading sequence has a relatively large voltage and second length of time wherein the spreading sequence has a relatively small voltage; and decoding the first length of time as a high data bit and the second length of time as a low data bit.

14. A communication gateway configurable to operate in a first operating mode that enables communication with a one-way utility meter or a second operating mode that enables communication with a two-way utility meter, comprising:

a front end module that receives a communication from a one-way utility meter, wherein:

the communication is carried via a signal with a modulated carrier frequency and a spreading sequence comprised of multiple chips, wherein the front end module amplifies and filters the signal, and the communication includes a packet comprised of multiple data bits, wherein each data bit has (i) a respective level based on an amplitude of the signal and (ii) a respective boundary and a respective length of time based on a predetermined quantity of the multiple chips, wherein the packet comprises a preamble that includes a predetermined quantity of the multiple data bits, a header that includes information identifying the utility meter, and a body that includes metering information;

a non-linear logarithmic decoder for filtering out the modulated carrier frequency to extract the metering information without decoding the spreading sequence, wherein extracting the metering information includes:

determining, based on the predetermined quantity of the multiple data bits included in the preamble, the respective boundary and the respective length of time of each data bit included in the communication, and determining, based the respective boundary and the respective length of time, the respective level of each data bit included in the communication;

a processor for interpreting the metering information; and a communication module for transmitting the metering information to a meter servicing device.

15. The communication gateway of claim 14, wherein the communication module is further operable for:

receiving a control signal from the meter servicing device prior to receiving the communication from the one-way utility meter; and in response to receiving the control signal, the processor configures the communication gateway to operate in the first operating mode that enables communication with the one-way utility meter.

16. The communication gateway of claim 14, wherein the spreading sequence identifies the modulated carrier frequency, and wherein the non-linear logarithmic decoder is operable to:

filtering the signal from the front end module to remove the modulated carrier frequency; and compare the spreading sequence against a clock;

use the comparison to determine the respective boundary of a particular data bit of the multiple data bits;

use the particular data bit boundary to determine a first length of time wherein the spreading sequence has a relatively large voltage and a second length of time wherein the spreading sequence has a relatively small voltage; and decode the first length of time as a high data bit and the second length of time as a low data bit.

* * * * *